Feb. 16, 1932. H. E. CHIPMAN 1,845,236
TALKING PICTURE APPARATUS
Filed Oct. 8, 1928 5 Sheets-Sheet 1

INVENTOR
Harry E. Chipman
BY
Henry Van Arsdale
his ATTORNEY

Feb. 16, 1932.　　　H. E. CHIPMAN　　　1,845,236
TALKING PICTURE APPARATUS
Filed Oct. 8, 1928　　5 Sheets-Sheet 2

INVENTOR
Harry E. Chipman
BY
Henry Van Arsdale
his ATTORNEY

Feb. 16, 1932. H. E. CHIPMAN 1,845,236
TALKING PICTURE APPARATUS
Filed Oct. 8, 1928 5 Sheets-Sheet 4

INVENTOR
Harry E. Chipman
BY Henry Van Arsdale
his ATTORNEY

Feb. 16, 1932.  H. E. CHIPMAN  1,845,236
TALKING PICTURE APPARATUS
Filed Oct. 8, 1928    5 Sheets-Sheet 5

INVENTOR
Harry E. Chipman
BY
his ATTORNEY

Patented Feb. 16, 1932

1,845,236

UNITED STATES PATENT OFFICE

HARRY E. CHIPMAN, OF SPRINGFIELD, MASSACHUSETTS, ASSIGNOR, BY DIRECT AND MESNE ASSIGNMENTS, TO ANDREW LE ROY CHIPMAN, OF NEW YORK, N. Y.

TALKING PICTURE APPARATUS

Application filed October 8, 1928. Serial No. 311,098.

This invention relates generally to the production and reproduction of talking motion pictures and more particularly to a sound recording and reproducing attachment adapted for association with either a picture camera or picture projector.

In my Patent No. 1,612,359 issued December 28, 1926, I disclose a method and apparatus for producing and reproducing talking motion pictures. In this patent the talking record or sound wire is shown secured to the picture film. With such an arrangement a specially constructed camera is necessary to contain the picture producing and the sound recording apparatus and a specially constructed projector is likewise necessary to contain the corresponding sound reproducing and picture projector apparatus. While this assembly has many desirable features, it nevertheless necessitates the purchase of a specially constructed instrument to contain this equipment or the remaking of the ordinary picture camera or projector now in use to contain this talking mechanism. The expense involved in this change may cause some motion picture producers and many of the smaller motion picture houses to hesitate in installing this special equipment.

A principal object of this invention, therefore, is to provide a sound recording and reproducing device which can be supplied as a distinct unit and which can be readily and quickly attached to the ordinary motion picture camera or projector without unnecessary expense or delay.

Another object of my invention is to provide a motion picture camera or projector attachment for recording and reproducing sound from a sound record separate from the picture film with means provided for advancing said sound record in such a manner that the sound recorded thereon or reproduced therefrom will at all times be properly synchronized with the pictures being produced on or reproduced from the film.

Another object of my invention is to provide a talking attachment for motion picture cameras or projectors in which the sound record can be readily and quickly removed or replaced as desired.

Still another object of my invention is to provide means for moving a sound record through a sound recording and reproducing mechanism in synchronism with the movement of the motion picture film in the picture camera or projector.

Another object of my invention is to improve upon the talking head disclosed in my patent above referred to. I have accordingly provided a "talking" head especially sensitive to the higher sound frequencies, and which will both record on the magnetic material and reproduce therefrom the higher sound frequencies with remarkable accuracy and clearness.

Another object of this invention is to provide a talking head especially adapted for recording only the sound recording material, unattached to any picture film.

Still another object of this invention is to provide a sound recording attachment for a motion picture camera by means of which a plurality of sound records may be made at the same time, each record being synchronized with the picture film being taken.

Another object of this invention is to devise a method and produce an apparatus by means of which a plurality of the same or different sound characteristics can be recorded on individual records, each and every record being in synchronism with the scenes and action being impressed upon the motion picture film.

Other objects of this invention will be in part obvious and a part pointed out as the disclosure proceeds.

My invention consists in providing a supporting plate adapted to be easily attached or detached as by screws to an outside wall of the ordinary picture camera or projector. This plate carries the complete sound recording and reproducing mechanism including the sound recording and reproducing head, and the reels carrying the sound record or "talk" wire. The "talk" wire, it is understood, passes from one reel through the talking head and winds upon the other reel during the operation of the device. These reels are mounted upon suitable shafts. One of these shafts forms the drive shaft for the "talk" mechanism. A drive pulley is secured to the inside end of this drive shaft. The drive pulley is connected to and driven by the film advancing mechanism. To move the magnetic record through the "talking" head at a continuous speed, a pair of cooperating rollers are provided disposed on opposite sides of the sound record. These rollers are provided with friction surfaces adapted to grip the sound wire and pull it forwardly. These rollers may be geared together and the roller assembly driven by means of pulley wheel and belting connections to the rotating drive shaft of the "talk" mechanism.

The reels carrying the sound record are so positioned on their respective shafts as to be readily and quickly removable, thus facilitating any change of sound record that may be desired.

I have further improved upon my talking head by provided pole pieces of special shape and reduced ends. With my special pole pieces I find that I am able to improve greatly upon sound recording and to reproduce the original sounds with a clearness and accuracy unattainable with present devices. My improved talking head has also been modified to properly receive the sound wire unattached and unaccompanied by a picture film.

The friction rollers advancing the sound wire are indirectly connected to and driven by the constant film advancing mechanism, the sound wire and film thus always moving together. The sound wire and film are both advanced at relative speeds. Synchronism between the sound wire and picture film is thus always established, and the motion picture and accompanying sounds can be reproduced again and again, provided only that the sound wire is properly positioned with respect to the film at the beginning of each run. It is understood that my attachment can be readily used for either sound recording or sound reproducing, and therefore is adapted for association with either a camera used in taking motion pictures, or a picture projector used in reproducing upon a screen the scenes impressed upon the film.

My invention contemplates further a method and arrangement whereby a plurality of sound records can be made during the taking or "shooting" of the motion picture film. By means of this method and arrangement I am able to record the spoken word, music, noises or different languages on individual records or any combination of them, all synchronized with the scenes and actions taken on the motion picture film by the camera. I accordingly provide an attachment or apparatus adapted for association with a motion picture camera by means of which a plurality of individual sound records may be made. A suitable support is provided adapted to carry a plurality of individual sound recording devices or recording heads. The sound records or talking wires are wound on individual reels, as before, and are drawn through their individual recording heads by means of suitable advancing rollers. The completed sound records are wound upon individual reels as before, each sound record having the same or different sound characteristics impressed thereon. The entire sound recording apparatus may be operatively connected to a moving element of the motion picture camera in such a manner that all the sounds of whatever nature, recorded on the individual sound records, are in true synchronism with the scenes and actions impressed upon the motion picture film by the camera.

The above apparatus may be attached directly to the side wall of the motion picture camera, or placed upon its own support. The camera and sound apparatus may be moved about in the picture studio as desired for the proper shooting of the picture. I provide a plurality of individual sound-proof booths in the studio. These booths may be glass enclosures and may be provided with reflecting mirrors, if necessary, so that the stage, or that portion of the picture studio where the scenes are being enacted, and the film director can be readily seen. Each booth may contain individual sound producing persons or devices and one or more microphones. A wiring arrangement connects the microphone or microphones in each booth to its respective recording head of the sound recording attachment. Thus the sounds produced in the individual booths are recorded on separate sound wires during the taking of the film. The scenes being enacted as well as the picture director are in full view to the person or persons producing the sound or sounds, either vocally or by sound devices, in the individual booths. The sounds produced in the different booths may be in the nature of spoken words, music, noise, foreign languages, etc.

In order that a clearer understanding of this invention may be had, attention is hereby directed to the accompanying drawings, forming a part of this application and illustrating certain possible embodiments of this invention.

Referring to the drawings.

Similar reference characters refer to similar parts throughout the several views of the drawings.

Figures 1, 2:
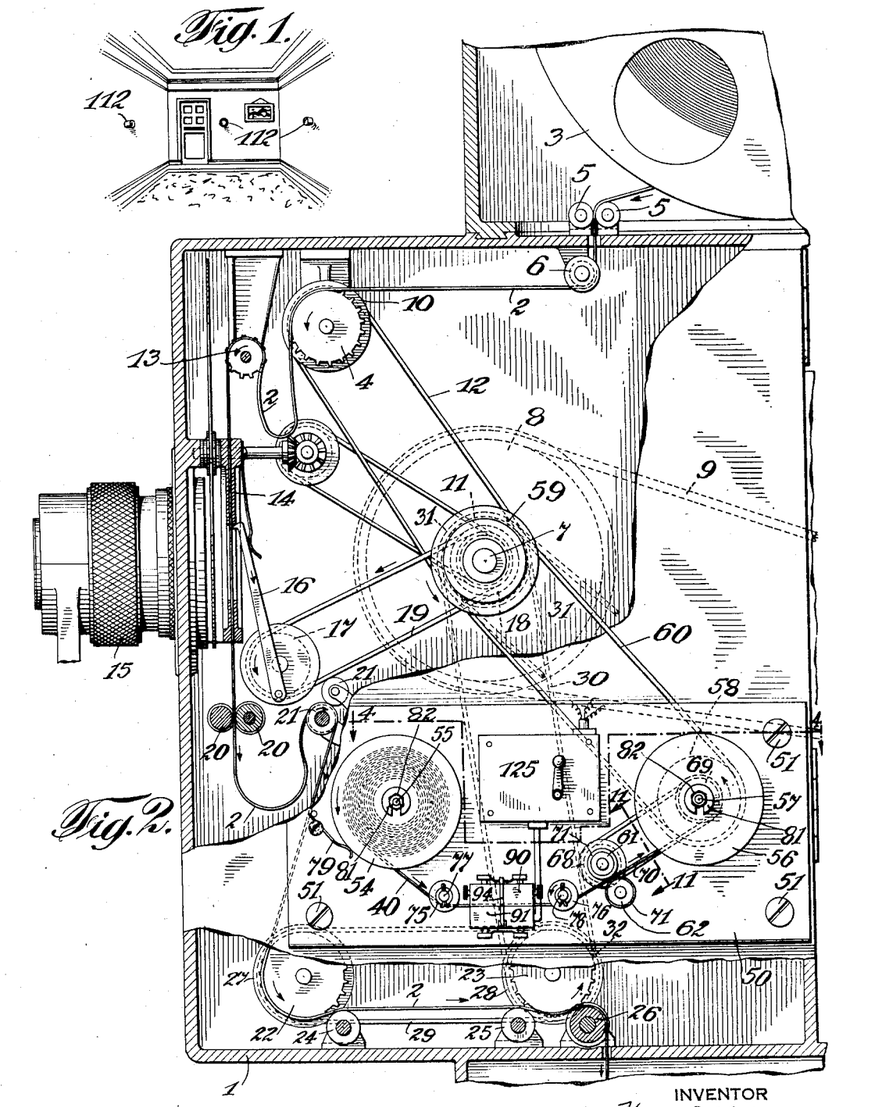
Fig. 1 represents a perspective view of a room in which the record may be made or the exhibition may be given, showing a suitable arrangement of instruments for receiving or transmitting sound.
Fig. 2 is a diagrammatic side elevation of a motion picture camera with sound recording and reproducing attachment secured thereto, and illustrates the operative connection between the film advancing and sound record advancing mechanism.
Figure 3:
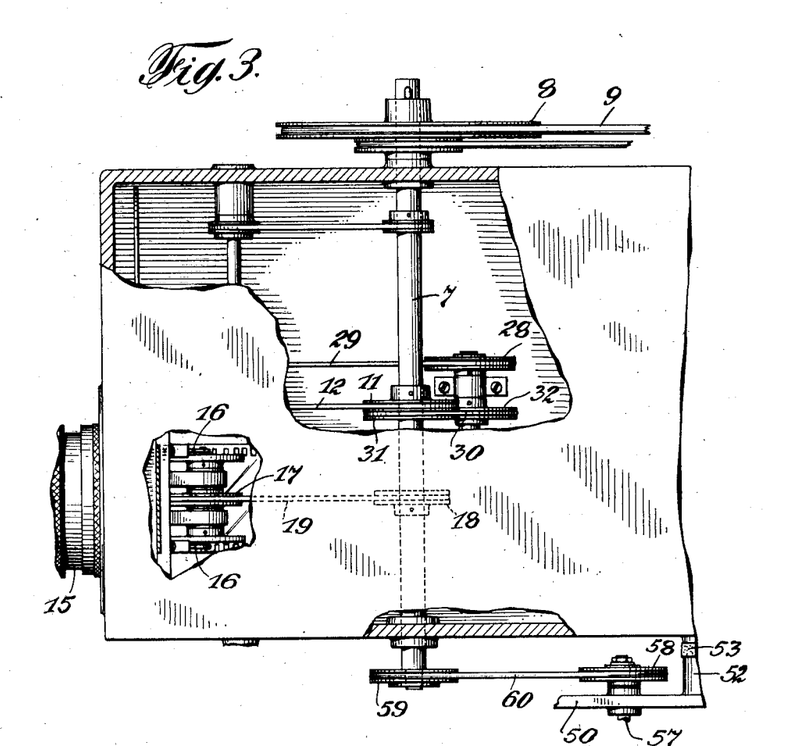
Fig. 3 is a top plan view of the picture camera with fragments broken away to more clearly show the operative connection between the drive shaft of the camera and the various driven elements of the camera and "talk" attachment.

It is understood that my sound recording and reproducing attachment is equally adapted for association with either a motion picture camera or a picture projection machine. For purposes of illustration, however, my "talking" attachment is shown in Fig. 2 as associated with a motion picture camera adapted for taking the motion picture negative. The picture taking mechanism is housed in a suitable container or box 1. The film 2 is wound on reel 3 from which it is continuously drawn by sprocket 4. Rollers 5 and roller 6 serve to guide the film to sprocket 4. The moving parts of the camera may be driven by a suitable motor (not shown) operatively connected to a drive shaft 7 of the camera by means of a pulley wheel 8 secured to the drive shaft and an endless belt 9 extending from the pulley wheel 8 to the motor. Sprocket wheel 4 is operatively connected to the drive shaft 7 by means of pulley wheels 10 and 11 and an endless belt 12.

The film passes over idler 13, through the guide frame 14 and past the light opening and photographic lens of the picture taking portion 15 of the camera. The film is moved intermittently across the photographic lens by any well known means, such for instance, as, a reciprocating pawl 16 operatively connected to drive shaft 7 through pulleys 17 and 18 and endless belt 19. The reciprocating pawl is adapted to engage with the perforations in the film to draw the same downwardly in the well known manner.

The film then moves between guide rollers 20 and loops between holding rollers 21 from which it is drawn by sprockets 22 and 23. The film is held in operative engagement with these sprockets by guide rollers 24, 25 and 26. After passing over roller 26 the film negative is wound upon a suitable take up reel, (not shown). Sprockets 22 and 23 are operatively connected together by means of pulley wheels 27 and 28 and an endless belt 29, and are driven from the drive shaft 7 by means of an endless belt 30 connecting pulley wheels 31 and 32.

Figure 4:
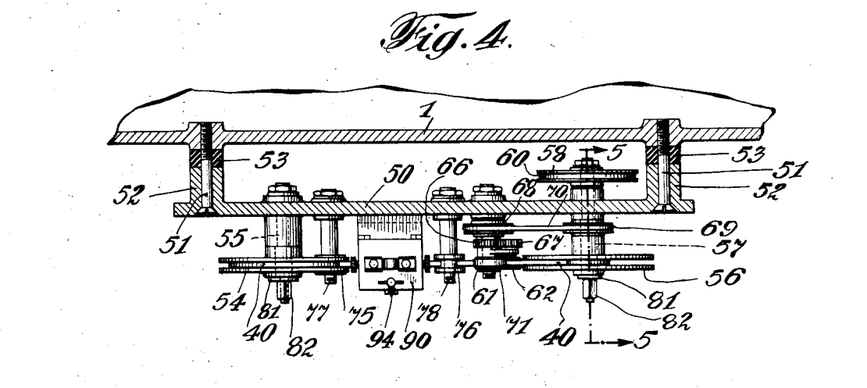
Fig. 4 is a horizontal cross sectional view of my sound recording and reproducing attachment, and illustrates one method securing the same to a side wall of a camera taken on line 4—4 of Fig. 2.
Figures 5, 6, 7, 8:
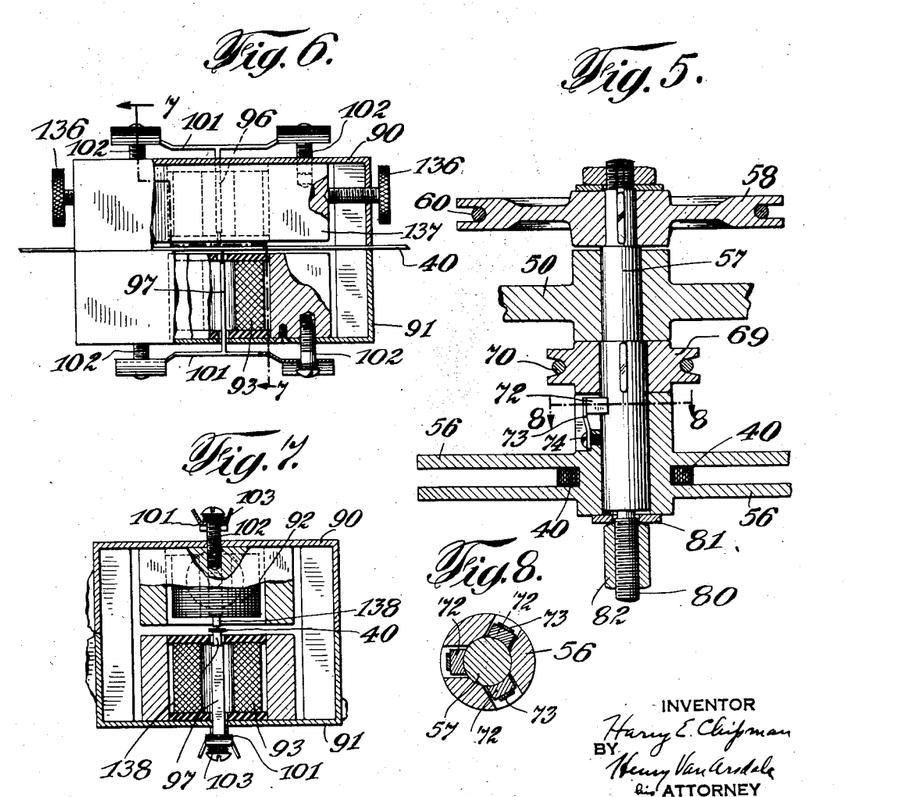
Fig. 5 is a view illustrating the connection between the film advancing mechanism and the sound record advancing means and is taken on line 5—5 of Fig. 4.
Fig. 6 is a side view of my improved sound recording and reproducing head with certain fragments broken away to more clearly show one of the pole pieces.
Fig. 7 is a transverse vertical cross sectional view of my improved "talking" head, taken on line 7—7 of Fig. 6.
Fig. 8 is a vertical cross sectional view taken on line 8—8 of Fig. 5 to illustrate more clearly the friction connection between the sound wire take up reel and its drive shaft.

My sound recording and reproducing attachment is adapted to be positioned outside the camera box 1 and is mounted upon a plate 50, as shown in Figs. 4 and 5. Plate 50 is secured to the side wall of the camera box 1 by means of screw bolts 51 extending through post portions 52 of the plate and into the side wall of the box. Cushion elements 53 may be provided on the ends of the post portions to cushion the plate to the side wall.

My sound record consists of a magnetic ribbon or wire 40 such as is disclosed in my prior patent above referred to. The same general devices are used both for recording sound on the sound wire by means of magnetic impressions, and in reproducing sound from the magnetic impressions already placed upon the wire. Therefore, for either sound recording or reproducing purposes the sound wire is carried upon a reel 54 journalled on a shaft 55 secured to and projecting laterally from the plate 50. From reel 54 the sound wire passes through the recording head, which will presently be described, and winds up upon a take up reel 56. Take up reel 56 is mounted on a drive shaft 57 (shown in Fig. 5) which is suitably journalled in the supporting plate 50.

Drive shaft 57 is rotated by means of the pulley wheel 58, which is keyed to the end of the shaft. A pulley wheel 59 positioned outside the camera box is operatively connected to the main drive shaft 7 of the camera. An outside belt 60 operatively connects pulley wheels 58 and 59. It is now seen that shaft 57 rotates whenever shaft 7 is rotated. Although I have shown the moving elements of my "talking" attachment operatively connected to the drive shaft 7 of the camera, it is understood that my attachment may be driven from a sprocket shaft or any other constant moving element of the camera within the contemplation of this invention. A positive drive connection between the drive shaft 57 of the sound attachment and some moving element of the camera may be desirable. I have accordingly illustrated in Fig. 15 a modified operative connection for this purpose permitting a positive drive. Drive shaft 57 may be provided with a tongue 45 on the inner end thereof adapted to be inserted into a cooperating slot 46 formed in the end of a convenient rotating shaft 47 of the camera. The attachment plate 50 is so positioned on the camera wall as to operatively connect the shafts 57 and 47.

In order that the magnetic impression placed upon the sound wire will be properly synchronized with the pictures taken on the film within the camera, it is essential that the sound wire move through the recording head at a controlled rate, relatively corresponding to the rate at which the pictures are photographed on or projected from the film. I have provided sound wire advancing means operatively connected to the drive shaft 57, which is operatively connected to the main drive shaft 7 of the camera as above explained. It is clear that the sound wire advancing means must operate independently of and be unaffected by the rotation of reel 56, since the take up reel, when rotating the shaft, would ordinarily pull the sound wire through the recording head at a lineal speed partly dependent upon the diametrical amount of wire wound thereon.

Figure 11:
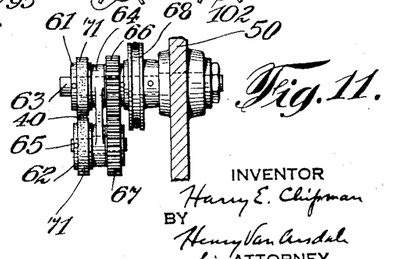
Fig. 11 is side elevation of my sound wire advancing rollers and connections taken on line 11—11 of Fig. 2.

I have provided means, therefore, which will advance the sound record at a lineal speed proportionate to the lineal speed at which the picture film is advanced. As shown in Figs. 2, 4 and 11, a pair of cooperating rollers 61 and 62 are disposed on opposite sides of the sound wire and rotate in opposite directions, thereby together drawing the sound wire through the recording head. Roller 61 is secured to a shaft 63 suitably journalled in the supporting plate 50. A yoke 64 suspended from shaft 63 carries a shaft 65 journalled therein. Roller 62 is secured to this shaft 65. Gear 66 secured to shaft 63 intermeshing with gear 67 secured to shaft 65 operatively connects the roller so that they may be driven in unison from the same shaft. The sound wire advancing rollers are driven by a pulley wheel 68 secured to shaft 63 operatively connected to a pulley wheel 69 keyed to the drive shaft 57 by means of an endless belt 70. The periphery of rollers 61 and 62 is preferably covered with some friction material 71 to insure a non-slipping grip of the rollers on the sound wire. I have found that a tire of soft rubber secured to the periphery of each roller is an excellent sound wire gripping material.

If the take up reel 56 were rigidly secured to drive shaft 57, the sound wire would be wound up thereon at different lineal speeds dependent upon the diametrical amount of sound wire already wound upon the reel. As is clear, such an arrangement would draw the sound wire through the recording head, and also through the sound wire advancing rollers producing a brake action on the advancing wire, and thus rendering uniform advance of the sound wire impossible. To remedy this difficulty, I operatively connect take up reel 56 to the drive shaft 57 by means of a friction device which will permit slippage of the reel on the shaft when the reel begins to pull on the sound wire. As shown in Figs. 5 and 8, a plurality of friction blocks 72 are resiliently held against the drive shaft by spring elements 73 secured to the hub of the reel by suitable means such as screws 74. As is evident, the reel will normally rotate with the shaft 57 to wind all the slack sound wire thereon. When all the slack wire between the advancing rollers and the reel has been taken up, the reel will begin to slip on its shaft, thus compensating for any tendency of the reel to wind up the wire faster than it is moved by the advancing rollers. A pair of guide rollers 75 and 76 rotating on stud shafts 77 and 78 respectively and secured to the supporting plate 50, direct the sound wire through the talking head. A brake element 79 as shown in Fig. 2 may be secured to the supporting plate and so positioned as to drag against the feed reel 54 to hold the sound wire fed therefrom reasonably taut.

Now it is seen that the sound wire is advanced at a uniform speed always proportionate to that at which the picture film is advanced. Identifying marks can be placed on the film at the start of the picture and on the sound wire at the start of the synchronized talk, so that in the showing of the talking picture, the picture film and sound wire may both be started from the same corresponding point. The film can then be run through the projector with the assurance that the "talk" from the sound wire will always be properly synchronized with the film showing.

It is often desirable to quickly replace the sound wire already associated with the sound recording and reproducing head with another sound wire, as for instance, when a change of film is made. Accordingly I have provided means whereby one set of sound wire reels may be easily and quickly replaced by another set. Shafts 55 and 57 carrying the sound wire reels are both provided with threaded ends 80 of reduced diameters, as shown more clearly in Figs. 4 and 5. A slotted washer 81 fits over the neck portion of the reduced end of each shaft 55 and 57. The slotted washer is held in place thereon by a nut 82 having a smaller outside diameter than the main portion of the shaft. The slotted washer, as is clear from the showing in Fig. 5, is of greater diameter than the main portion of the shaft, and thus retains the reel on the shaft. By simply unloosening nut 82 a half turn, the slotted washer can be slipped off from the reduced end 80 of the shaft, the reel moved over the nut and pulled off from the shaft.

Figure 9:
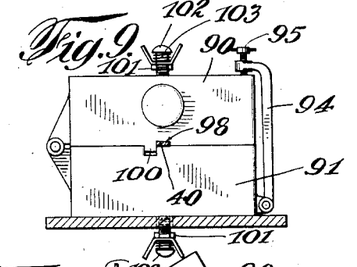
Fig. 9 is a side elevation of my improved talking head adapted for receiving a single sound wire.
Figure 10:
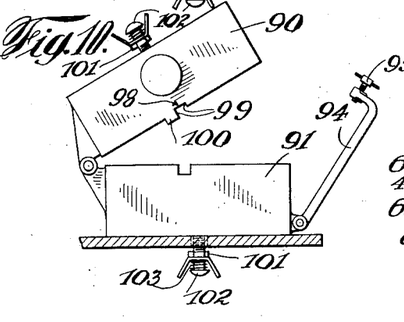
Fig. 10 is another side elevation of the same, showing the two segments comprising the recording head swung apart.

The sound recording and reproducing device, otherwise known as the "talking" head, as shown in Figs. 6, 7, 9 and 10 comprises a top segment 90 and a bottom segment 91 hinged together at one edge. An upper electromagnet 92 and a lower electromagnet 93 are positioned in the respective segments 90 and 91, between which the sound ribbon or wire 40 is adapted to pass. The upper and lower segments may be clamped together when in operative position by means of an adjustable clamp 94, such as shown in Figs. 8 and 9. The clamp is hinged to one segment and is adapted to swing over the top of the other segment. The end portion of the clamp is provided with a screw 95 extending through a threaded opening in the same, which screw may be adjusted into clamping contact with the top surface of the upper segment.

The upper electromagnet 92 is provided with a core or pole piece 96 which extends downwardly through the same and a similar core piece 97 extends upwardly through the lower electromagnet 93. The sound ribbon or wire 40 passes through a longitudinal opening or slot 98 cut in the under surface of the upper segment 90. Except for this small sound wire opening the upper and lower segments come completely together when in clamped position. The longitudinal slot 98 is of such dimension as to properly guide the wire, and is provided with smooth side surfaces 99. A locking tongue 100 formed on the upper segment and adapted to be received in a corresponding recess in the lower segment, serve to properly align the segments.

The core piece 96 is spring pressed downwardly so as to bear upon the upper surfaces of the sound ribbon 40 as the same is advanced and the lower core piece 97 is spring pressed upwardly into engagement with the under surface of the sound ribbon. Each core piece 96 and 97 is carried by a flat spring strip 101 which is slidably mounted on a pair of screws 102 projecting from its corresponding segment. Each screw 102 is headed so as to retain a coil spring 103 thereon which is pressed between the head and the spring strip. The spring pieces in spring engagement with the sound ribbon.

Figure 12:
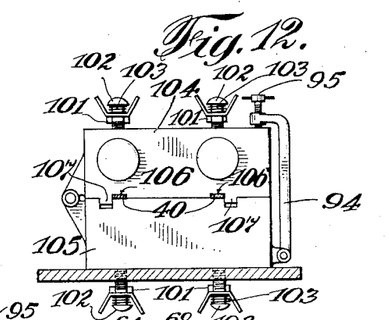
Fig. 12 is a modified construction of my talking head especially designed to receive two "talk" wires at the same time.

Sometimes it is desirable to make two or more records of the sound associated with the picture negative being made. These sound records may either carry the same sound or different sounds such as the talking voice, music, noise, etc., all synchronized with the picture film. In showing the talking picture, it may be desirable to combine the talking voice impressed on one sound record with music or noise representations on the other to obtain variety of sound effects. The several records are then run through individual reproducing devices in synchronism with the film showing. Or, again, in showing the talking picture it may be desirable to use two or more sound wires on which duplicate magnetic sound records are impressed, in order that the volume of the reproduction shall be correspondingly greater and the higher frequencies more faithfully recorded. Accordingly, I have provided a specially constructed recording head, shown in Fig. 12, adapted to either record on or to reproduce from two separate sound wires at the same time. The upper recording magnets are contained within upper segment 104 and the lower recording magnets within the lower segment 105. The upper segment is provided with a pair of spaced longitudinal slots or grooves 106 of the proper size to contain the sound wire. The upper segment is also provided with a pair of locking tongues 107 adapted to be received in corresponding recesses in the lower segment. Except for the slots 106 the two segments close tightly together.

The circuit connections by which the magnetic record is impressed on the sound wire will now be described. Each of the electromagnets 92 and 93 are provided with a primary winding indicated at 110, Fig. 13, and a primary winding indicated at 111. If a sound record is to be made, one or more instruments 112, are provided. These instruments or devices, broadly considered, may comprise any electro-magnetic means for producing a fluctuating current from the various forms of energy such, for example, as sound waves, radio waves, mechanical or electrical movements impressed thereon. For purposes of illustration I have shown microphones as representative of this class of instruments. These microphones comprising generally the well known diaphragm arrangement against which the sound waves impinge, and electromagnets which are energized with a varying intensity, in accordance with the movement of the diaphragm under the action of the sound waves impinging on the same. When the sound record is made and the corresponding motion picture is taken, the instruments 112 may be located at various points about the walls of the studio, as shown in Fig. 1, and in such a manner that the sound waves will be picked up strongly by one or another of the instruments at whatever point in the room the performer is located.

The electromagnets within the microphones are constantly energized by means of an electric current which flows from battery 113, through variable resistance V through conductor 114, through conductor 115 and to the electromagnets of the respective microphones positioned in parallel arrangement. From the electromagnets of the microphones the current flows through conductor 116, through the amplifier A, through conductor 116', through the primary winding 117 of the induction coil 118 and back to the battery through conductor 119. It has been found that much finer recording results are obtained by inserting in this circuit an amplifier and a transformer whose secondary and primary windings are in approximate proportion respectively of fourteen to one. The amplifier A of well known construction, is connected in series with the microphones 112 between conductors 116 and 116' and the transformer T is connected in parallel with the microphones across the conductors 115 and 116' as clearly shown in Fig. 13. A switch 127 conveniently located may be provided to open and close this circuit.

Figure 13:
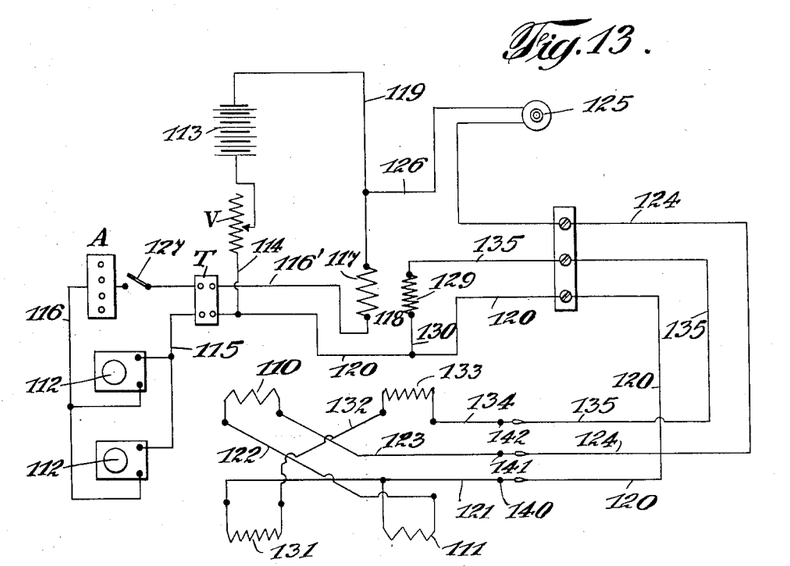
Fig. 13 is a diagrammatic illustration of the electrical connections for my sound recording and reproducing head and wiring connections for recording sound.

The primary windings 110 and 111 of the upper and lower electromagnets 92 and 93 respectively are constantly energized from the battery so as to maintain the opposite polarities of their core pieces. Current flows from the battery 113 through conductor 114 thence through conductor 120 and through conductor 121 to the primary winding 111 of one of the recording electromagnets. From this recording electromagnet the current flows through conductor 122, through the primary winding 110 of the other recording electromagnet in series with the first thence through conductor 123 and conductor 124 to the fixed resistance 125. The strength of the current flowing through the primary windings 110 and 111 of the recording electromagnets is reduced by this fixed resistance 125, shown in Fig. 2 as secured to the supporting plate 50. Current flows through the variable resistance 125, through conductor 126, through conductor 119 and back to the battery.

When sound waves impinge against the diaphragms of instruments 112, the current will be varied in the circuit which includes the electromagnets of instruments and the primary winding 117 of the induction coil 118. A corresponding varying current will be induced in the secondary windings 129 of the induction coil. The induced current from the induction coil 129 flows through conductor 130, through conductor 120, through conductor 121, to the secondary winding 131 of one of the recording electromagnets, thence through connections 132 to the secondary recording magnet winding 133 of the other recording magnet connected in series with the first, and finally through connectors 134 and 135 back to the other terminal of secondary winding 129 of the induction coil.

The above construction operates to vary the magnetic fields of the recording electromagnets in accordance with the sound wave vibrations received by the instruments 112 and accordingly to magnetize the metallic sound wires 40 as they pass through the recording head, with a corresponding magnetization of varying intensity.

As is evident by referring to Fig. 6, the lower core piece 97 is offset somewhat in the direction of travel of the sound wire from the upper core piece 96. A clearer record and better reproduction is thus obtained. The spaced relation of the core piece can be adjusted as desired by manipulating adjusting screws 136 to move the block 137 in which the core piece and recording electromagnet is carried, one way or the other.

I preferably form the end portions 138 of my core pieces of reduced cross section, as shown in Figs. 5 and 6. With such reduced ends, I find that I am able to record the higher sound wave frequencies and higher tones with remarkable clearness and accuracy. It would appear that by making the sound wire contacting ends of the pole pieces very thin and of reduced cross section, that the lines of force set up by the fluctuating current in the pole pieces are greatly concentrated, magnetizing the sound wire more intensely and effectively. Whatever the theory behind the recordation of the higher frequencies, however, I find that with my specially constructed core pieces I am able to record the higher frequencies more clearly and effectively than heretofore attempted.

My attachment is as well adapted to reproduce sounds from a magnetized sound wire as to record sound thereon. The "talking" head is therefore preferably provided with socket terminals 140, 141 and 142 on the end of wires 121, 123 and 134 to permit the various recording and reproducing devices to be attached and detached at will.

Figure 14:
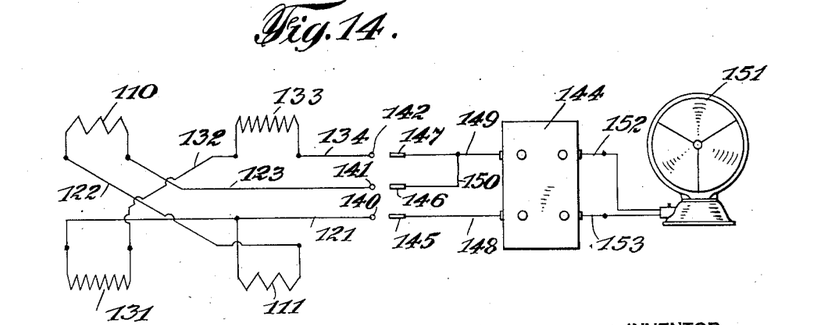
Fig. 14 shows the wiring of my recording and reproducing head and the associated wiring connections for reproducing sound from the "talk" wire.

In producing sound from the magnetized sound wire, a wiring arrangement such as shown in Fig. 14, may be used. An amplifying device 144 of well known construction is provided with three terminals 145, 146 and 147 adapted to plug into the socket terminals 140, 141 and 142 respectively of the talking head. Terminals 145 and 147 are operatively connected to the amplifying device 144 by conductors 148 and 149, and terminal 146 is directly connected to conductor 149 by conductor 150. The loud speaker 151 or other talking device is operatively connected to the amplifier by conductors 152 and 153.

To reproduce sound, the magnetized sound wire is run through the talking head from reel 54 to reel 56, in the usual manner. An electric current which fluctuates in accordance with the variations of magnetic intensity in the magnetized sound wire will be induced in the primary windings 110 and 111 of the respective upper and lower electromagnets. From the primary windings the current will flow through conductors 121 and 148 and through conductors 123, 150 and 149 to the amplifying device 144. A corresponding fluctuating current will be induced in the secondary windings 131 and 133, connected in series with each other. From the secondary windings current will flow through conductors 134 and 149 and through conductors 121 and 148 into the amplifier. It is thus seen that the fluctuating current from both the primary and secondary windings reenforcing each other, flows into the amplifier.

It will be understood that I also contemplate using my talking attachment herein disclosed in connection and association with my broadcasting apparatus disclosed in my copending application Serial No. 274,775 filed May 3, 1928. This arrangement is advantageous where the audience is some distance from the talking attachment, and is desirable where the sound is to be broadcast. To broadcast the program the output terminals of the broadcasting apparatus above referred to are simply plugged into the terminal sockets 140, 141 and 142 of my recording head.

It is now seen that my "talking" attachment can be quickly and readily attached to either a picture camera or a picture projector. It is simple in design and construction and can be easily made at small cost, thus making "talking" movies more universally accessible to both producers and motion picture houses.

It may be desirable to make a plurality of sound records of the same or different sounds as the picture is being filmed, or again it may be desirable to reproduce a plurality of corresponding or different sounds in synchronism with a film showing. For this purpose I have provided a modified recording and reproducing attachment or apparatus adapted for association with either a picture camera or picture projector.

Figure 16:
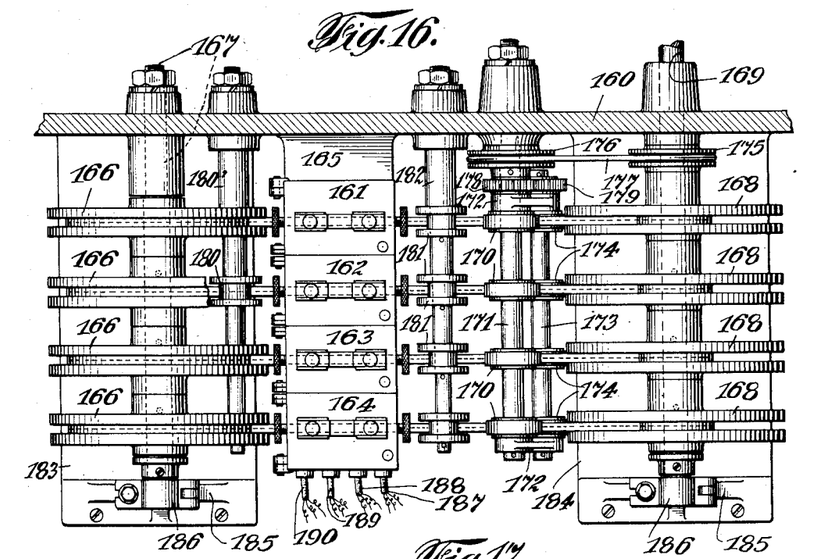
Fig. 16 shows a modified form of my sound attachment or apparatus by means of which a plurality of the same or different sounds may be recorded on individual sound records.

A supporting plate 160 is provided which may be attached to either a camera or projector in the usual manner. A plurality of individual recording and reproducing devices or talking heads 161, 162, 163, 164 constructed as heretofore described, are supported by means of a suitable bracket 165 from the supporting plate 160. A corresponding member of magnetic sound ribbon carrying reels 166 are rotatively positioned on shaft 167 projecting from the supporting plate 160 and journalled therein. A corresponding member of take up reels 168 rotate on shaft 169 projecting from and journalled in the supporting plate 160. Shaft 169 constitutes the drive shaft for my sound attachment and is operatively connected in some manner, as heretofore described, to a moving element of the camera or projector. Each take up reel may be provided with a slip device such as shown in Figs. 5 and 8 so that the sound records will not be drawn through the talking head by the rotation of the take up reels.

Cooperating advancing rollers as heretofore described, are provided to draw the individual sound records through their respective talking heads. Upper advancing rollers 170 are secured to shaft 171 suitably journalled in supporting plate 160. A pair of yokes 172 suspended from shaft 171 carry shaft 173 journalled therein. The lower advancing rollers 174 cooperating with the respective upper advancing rollers are secured to shaft 173.

Upper shaft 171 is operatively connected to the drive shaft 169 by gearing, or any suitable means. I have shown for purposes of illustration pulley wheel 175 secured to shaft 169 driving pulley wheel 176 secured to shaft 171 by means of an endless belt 177. Gear 178 secured to shaft 171 intermeshes with gear 179 secured to shaft 173. Thus, it is seen that each pair of rollers are driven in opposite directions and so positioned as to draw their respective sound records forwardly through the individual talking heads. The advancing rollers are covered with some friction material as heretofore described, thus obtaining a non-slipping grip on the individual wires.

Guide rollers 180 journalled on shaft 180' projecting from the supporting plate guide the respective sound ribbons into the respective talking heads. Guide rollers 181 journalled on shaft 182 positioned on the opposite side of the talking head guide the respective sound ribbons to the advancing rollers.

My sound attachment is sturdily built so as to withstand hard usage. Props or brackets may be used to strengthen the construction and aid in supporting the same. I have shown for this purpose supporting foot pieces 183 and 184 positioned respectively under reel carrying shafts 167 and 169. A pedestal support 185 is secured to each of the foot pieces. The reel carrying shafts are journalled in journal boxes 186 provided in the top of the respective pedestal supports.

Cables 187, 188, 189 and 190 lead from their respective talking heads 161, 162, 163 and 164. Each cable contains three wires, as is clear from referring to Figs. 13 and 14. In recording the wires in each talking head cable are connected in circuit with various instruments, as shown in Fig. 13. In reproducing the talking cables may be connected to common or individual amplifiers and loud speakers, as shown in Fig. 14.

Figures 15, 17:
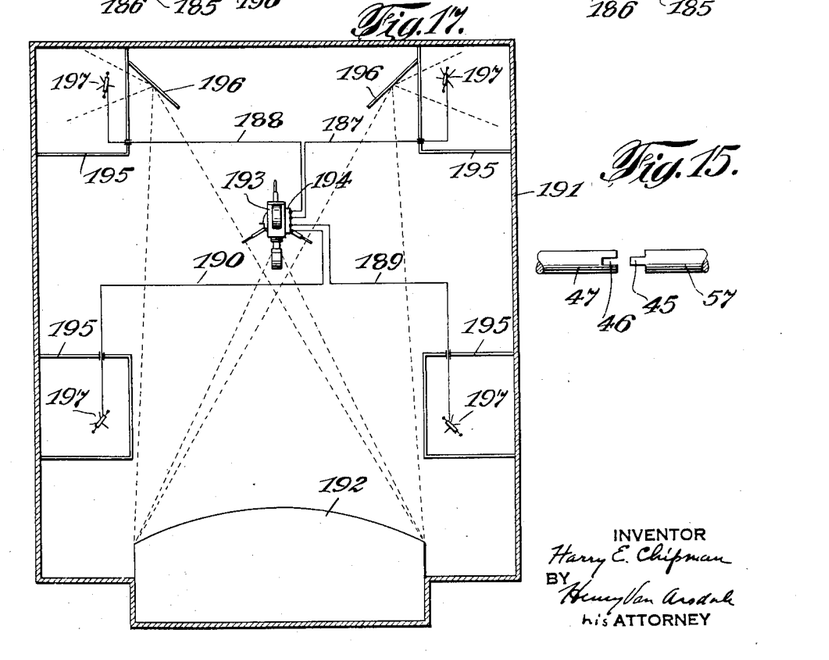
Fig. 15 is a modification of my drive connection between the drive shaft of my sound attachment and a moving element of the motion picture camera.
Fig. 17 shows a studio arrangement for producing the plurality of individual sound records, during the filming of the picture, and in synchronism therewith.

In Fig. 17 I have illustrated a studio arrangement in which sound motion pictures and a variety of sound records, synchronized with the picture film, may be made. The studio 191 may be generally of any convenient shape. For purposes of illustration it will be presumed that the scenes to be taken are enacted, for example, on the stage 192. The camera with my associated sound apparatus 194 above described, is preferably of the portable type so that it can be variously positioned to properly photograph the enacted scenes. Sound proof booths 195 preferably portable are conveniently positioned in the studio out of the way of the camera. These booths may be in the nature of glass enclosures so that the motion picture director, actors and camera man are clearly visible from the respective booths. Reflecting mirrors 196 may also be used where necessary to effect this visibility. Cables 187, 188, 189 and 190 containing the circuit wires lead from their respective talking heads to the respective booths 195. A microphone 197 is positioned in each booth connected in circuit with the wires leading from the talking head as heretofore described. It is seen that the various sounds produced in the respective booths are transmitted from the microphones therein to the respective talking heads where the sounds are recorded on the magnetic sound wires.

This arrangement is advantageous, for example, in the production of sound motion pictures in various languages and tongues. To this purpose one or more linguists are stationed in the respective booths, watching the scenes being enacted, the picture director and camera man. The respective linguists utter lines in the respective languages all in synchronism with the scenes impressed upon the camera film. The talk in the various tongues are recorded upon individual sound wires, as heretofore described. The sound wires bearing the talk in the various tongues can then be sent to the country speaking the respective tongues for reproduction along with the picture film.

Various combinations of music, noise and speaking voice can be synchronized with the picture film by means of my arrangement. For example, in one booth sound may be produced to simulate the rumbling of thunder, the gallop of hoofs or the beating of the waves, and in another the talking voice of the actors in the picture all synchronized with the picture scenes. The sound wires carrying these respective sounds can be reproduced by means of my modified sound attachment above described each individually and collectively synchronized with the film showing. Thus it is seen that my attachment lends itself readily to the recording of various sounds of all conceivable characters all synchronized with the scenes on the picture film. It is also clear that various combinations of these sounds can be reproduced along with the film showing.

As many changes could be made in the above construction, and as many widely different embodiments of this invention could be made without departing from the scope thereof, it is intended that all matters contained in the above description or shown in the accompanying drawings shall be interpreted as illustrative and not in a limiting sense.

What I claim is:—

1. Combined sound and picture apparatus, including, in combination, motion picture apparatus having a drive shaft, and sound apparatus including a supporting plate, a sound recording or reproducing head, a driving shaft, a pair of reels for magnetic ribbon, one of said reels being mounted for rotation on said shaft, and means operatively connected to said driving shaft for progressing magnetic ribbon from one reel to the other through said head, all carried on said plate, said driving shaft being operatively connected to the drive shaft of the picture apparatus.

2. Combined sound and picture apparatus, including, in combination, motion picture apparatus having a drive shaft, and sound apparatus including a supporting plate, a sound recording or reproducing head, a pair of reels for magnetic ribbon, means, including a pair of ribbon advancing rollers, for progressing magnetic ribbon from one of said reels to the other through said head, and a driving shaft, all carried on said plate, one of said reels being rotatably mounted on said shaft, a driving connection between said shaft and one of said ribbon advancing rollers, and a driving connection between the drive shaft of the picture apparatus and the driving shaft of the sound apparatus.

This specification signed this 26th day of September, 1928.

HARRY E. CHIPMAN.